(12) United States Patent
Lin (10) Patent No.: US 11,358,365 B2
(45) Date of Patent: Jun. 14, 2022

(54) SPLICABLE ENVIRONMENTALLY-FRIENDLY NON-PVC ADVERTISING CLOTH MADE OF A WOVEN STRUCTURE

(71) Applicant: TAYA CANVAS (SHANGHAI) COMPANY LIMITED, Shanghai (CN)

(72) Inventor: I-Chien Lin, Shanghai (CN)

(73) Assignee: Taya Canvas (Shanghai) Company Limited, Shanghai (CN)

( * ) Notice: Subject to any disclaimer, the term of this patent is extended or adjusted under 35 U.S.C. 154(b) by 12 days.

(21) Appl. No.: 17/103,163

(22) Filed: Nov. 24, 2020

(65) Prior Publication Data
US 2021/0170716 A1    Jun. 10, 2021

(51) Int. Cl.
*B32B 27/08* (2006.01)
*B32B 5/02* (2006.01)
*B32B 7/10* (2006.01)

(52) U.S. Cl.
CPC .............. *B32B 5/024* (2013.01); *B32B 5/026* (2013.01); *B32B 7/10* (2013.01); *B32B 27/08* (2013.01); *B32B 2250/04* (2013.01); *B32B 2250/24* (2013.01); *B32B 2262/0215* (2013.01); *B32B 2307/3065* (2013.01); *B32B 2307/4023* (2013.01); *B32B 2307/712* (2013.01); *B32B 2307/7265* (2013.01); *B32B 2307/738* (2013.01); *B32B 2398/20* (2013.01)

(58) Field of Classification Search
CPC ............ B32B 2250/02; B32B 2250/04; B32B 2250/20; B32B 2250/24; B32B 2255/02; B32B 2255/26; B32B 2255/28; B32B 2262/0215; B32B 2262/0276; B32B 2307/3065; B32B 2307/4023; B32B 2307/54; B32B 2307/712; B32B 2307/7163; B32B 2307/7265; B32B 2307/738; B32B 2398/20; B32B 2590/00; B32B 27/08; B32B 5/024; B32B 5/026; B32B 5/028; B32B 5/26; B32B 7/10; B32B 7/12; D04B 1/16
See application file for complete search history.

*Primary Examiner* — Lawrence D Ferguson
(74) *Attorney, Agent, or Firm* — Rosenberg, Klein & Lee (57) ABSTRACT

A splicable environmentally-friendly non-PVC advertising cloth made of a woven structure, wherein the advertising cloth comprising a mesh base layer (40); a first adhesion-promoting structural layer (10), which is a refractory and waterproof layer covering the front surface (43) and the rear surface (44) of the mesh base layer (40); a second adhesion-promoting structural layer (20) coated on the first surface (13) of the first adhesion-promoting structure layer (10); and a third adhesion-promoting structural layer (30) coated on the upper surface (24) of the second adhesion-promoting structure layer (20), therefore, waterproof and ink-absorbing structure arranged on a mesh base (40) layer, and the width of the advertising cloth (50) can be spliced unlimitedly as required by using high frequency splicing, making the environmentally friendly advertising cloth more applicable also improving the overall advertising effect and quality.

2 Claims, 9 Drawing Sheets

SPLICABLE ENVIRONMENTALLY-FRIENDLY NON-PVC ADVERTISING CLOTH MADE OF A WOVEN STRUCTURE

BACKGROUND OF THE INVENTION

1. Field of the Invention

The invention relates to an advertising cloth structure, especially to one that is a splicable environmentally-friendly non-PVC advertising cloth made of a woven structure.

2. Description of the Related Art

In the prior art, most of the materials used for the advertising or the parasols or awnings in shop were canvas, the canvas can perform the functions of display, sun protection and rain protection. The earliest woven PE canvas was made by interlacing longitudinal and transverse PE threads into a single-colored or stripe-colored fabric layer, since the fabric layer is not waterproof, a laminated layer is required for achieving the waterproof function. The laminated layer has the advantage of a low specific weight, but the laminated layer does not adhere easily to the surface of the fabric layer. In addition, the laminated layer is too thin, and its own material is not soft enough. If the PE canvas is folded or collided, the laminated layer at the fold point can easily be damaged or detached, and the PE canvas loses its waterproof function, which is the main disadvantage.

To solve this problem, a new kind of PVC canvas was developed, it is formed by gluing or hot pressing a layer of PVC on the upper and lower surfaces of the fiber substrate layer in the middle, it is waterproof, so it is also used as a waterproof sunshade and advertising wall covering, so it indeed solves the problem of PE wall covering being not durable and easy to get damaged; However, the specific gravity of PE wall covering is about 1, but the specific gravity of PVC wall covering is about 1.4, so its weight is more than 40% heavier than PE wall covering. PVC is the abbreviation of polyvinyl chloride. The Greenpeace International Organization calls it "toxic plastic", but because of its cheapness and convenient of manufacturing, it has become the second-largest general-purpose plastic whose output is second only to PE. It is widespread in our lives and threatens our environment and health.

Moreover, PVC is the only chlorine-containing plastic among the five general-purpose plastics [PE, PVC, PP, PS, ABS]. Since it contains chlorine, by adding plasticizer can adjust its softness. Except for plasticizers, the thermal stability of PVC is very poor, in order to avoid the cracking of PVC products under the sun or high temperature, stabilizers must be added, usually are heavy metals such as Lead, Cadmium, and Zinc. Therefore, PVC is just PVC, but also contains some plasticizers and stabilizers that are harmful to health and the environment; PVC without adding anything at all is not poisonous, but it is also useless.

Greenpeace International Organization calls the PVC as "toxic plastic", is not because PVC itself that contains no additives, or It is not because PVC products that contain additives, but in their entire producing life cycle, from raw material mining to production, use and disposal, PVC is harmful to the environment and human health.

The advertising industry is an industry with rapid updates, so outdoor advertising has only a short period of use, ranging from half a year to several days. PVC coated mesh cloth that used as the digital inkjet advertising cloth is hard to recycle after use. PVC has bright color, corrosion resistance, strong durability, but poor thermal stability and light resistance. Hydrogen chloride begins to decompose when it is above 100° C. or exposed to long-term sunlight. Therefore, stabilizers, plasticizers, anti-aging agents, etc. must be added when manufacturing plastics to enhance its heat resistance, toughness, ductility, etc. The density of pure PVC is 1.4 g/cm$^3$, and the density of PVC added with plasticizers is generally 1.15~2.00 g/cm$^3$. These harmful additives and plasticizers in PVC may effuse or vaporize, and further interfere with biological endocrine, affect fertility, and increase the risk of having cancer. Therefore, some types of plasticizers have been listed as substances of high concern in EU countries, and their use is completely prohibited. Furthermore, PVC has the disadvantage of shrinking. Furthermore, the general landfill methods for PVC coated mesh cloth after used are:

1. Separation: The disadvantage is that it is difficult to separate the PVC after being laminated to the mesh.
2. Landfill: The disadvantage is that the PVC itself takes decades to decompose, and the decomposed objects are harmful to the soil and water.
3. Incineration: The disadvantage is that PVC will release carcinogenic Dioxin during the combustion process and pollute the air.

Therefore, in March 2018, the applicant proposed a utility model for "wall cloth with ink absorption fireproof and waterproof properties", comprising a mesh base layer (40); a first adhesion-promoting structural layer (10), which is a knitted fabric made of warp threads (41) and weft threads (42), the warp threads (41) and the weft threads (42) are made of polyester fiber, and wherein the mesh base layer (40) has high density meshes (45) and tensile strength, a fireproof and waterproof layer made by coating the slurry on the mesh base layer, the slurry is made of acrylic resin which is the main component mixed with fireproof and water agent; and an ink-absorbing structure arranged on the fireproof and waterproof layer. Therefore, the mesh base layer (40) has structure with fireproof, waterproof and ink-absorbing, so that the wall covering is PVC-free and non-toxic, especially suitable for advertising, interior decoration, etc., and meets the medical level of users. This type of patent can be seen in the applicant's patent No. ZL2018 2 0351837.4 and Taiwan patent No. M562864.

Figure 1A:
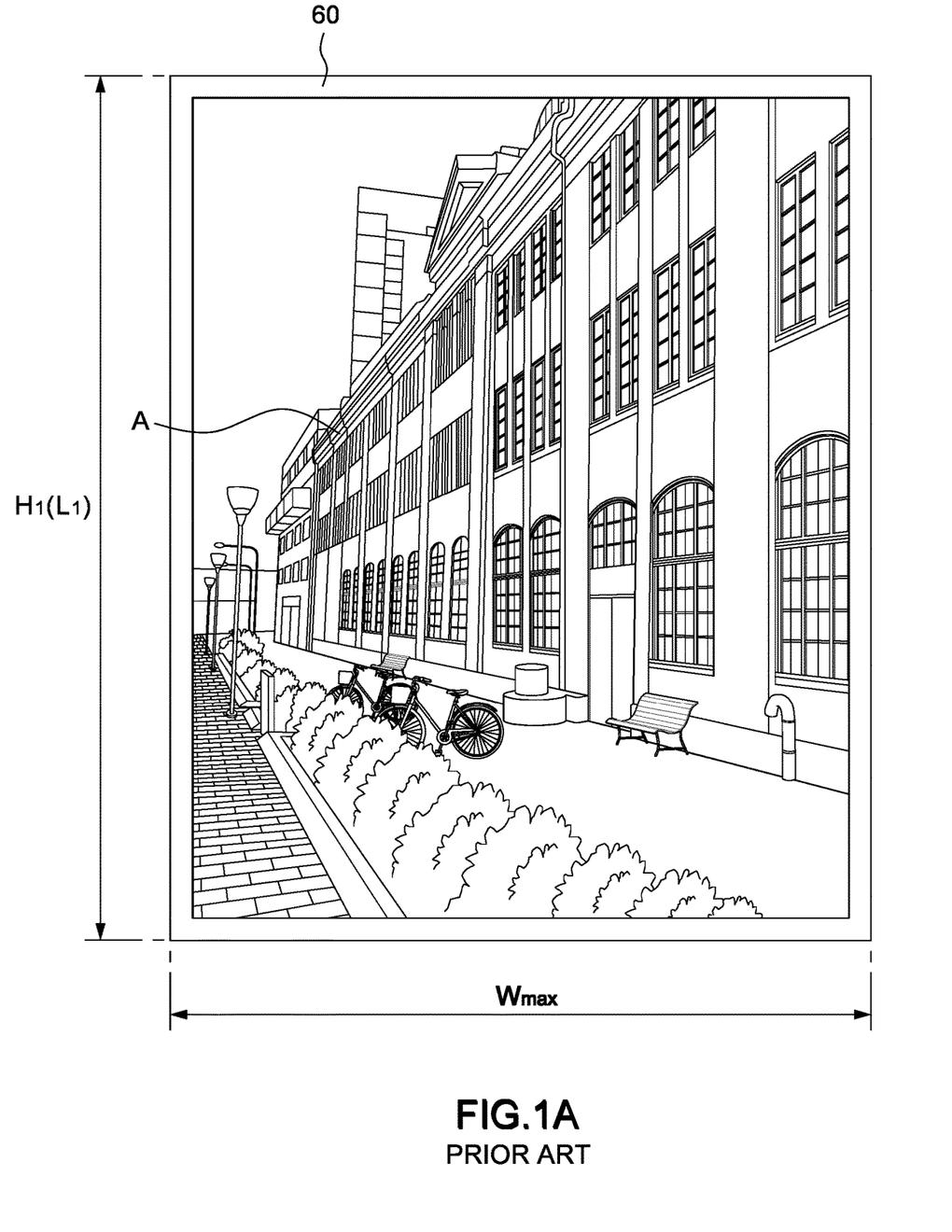
FIG. 1A is a schematic diagram illustrating a conventional woven structure wall cloth with advertisement on it.
Figure 1B:
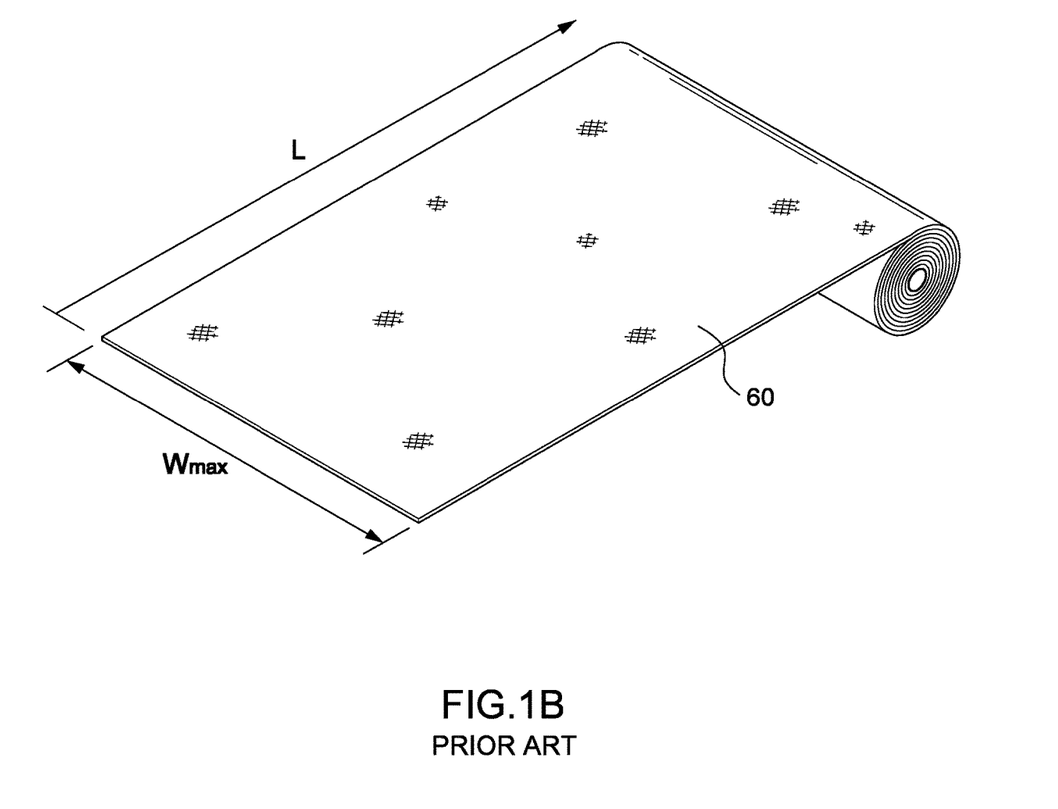
FIG. 1B is a schematic diagram illustrating the conventional woven structure wall cloth while rolling up.

However, as FIG. 1A and FIG. 1B showing, the wall cloth (60) length (L1) after molding is exceedingly long but can be rolled up. So, if we make an advertisement A, regardless of whether its height (H1) is several meters to several tens of meters, it can easily be cut as required. However, the maximum width (Wmax) of advertising (A) is limited by the existing technology and machine and can only have a width of approximately 5 meters, which is why the advertisement (A) produced by the wall cloth (60) can only be within 5 meters. If the advertisement exceeds 5 meters, it cannot be used. Restricted to the material and structural layer of the wall cloth (60), there is no connection can be spliced to increase the width, which is not perfect.

SUMMARY OF THE INVENTION

It is a primary objective of the present invention to provide a splicable environmentally-friendly non-PVC advertising cloth made of a woven structure that has a composite structure with fire-proof, waterproof and ink-absorbing structure arranged on a mesh base layer, a PVC-free and non-toxic structure, furthermore, the width of the advertising cloth can be spliced unlimitedly by using high frequency splicing as required, making the environmentally friendly advertising cloth more applicable also improving the overall advertising effect and quality.

Another objective of the present invention is to provide a splicable environmentally-friendly non-PVC advertising cloth made of a woven structure that has a physical structure feature with a specific gravity of less than 1, it has a physical structure with a specific gravity of less than 1. The advertising cloth structure has a specific gravity of 35% less than that of PVC advertising cloth. It is light in weight and easy to use, while maintaining high tensile strength and excellent water resistance.

In order to achieve the above objectives, the present invention includes a mesh base layer (40), which is a knitted fabric made of warp threads (41) and weft threads (42), the warp threads (41) and the weft threads (42) are made of polyester fiber, and wherein the mesh base layer (40) has high density meshes (45) and tensile strength, and wherein the mesh base layer (40) further has a front surface (43) and a rear surface (44); a first adhesion-promoting structural layer (10), which is a fireproof and waterproof layer having fireproof and waterproof material (11) and an adhesive (12) coated on the mesh base layer (40) for the slurry penetrating the meshes (45) and covering the front surface (43) and the rear surface (44) of the mesh base layer (40) to form a first surface (13) formed on the front surface (43) and a second surface (14) formed on the rear surface (44), so that the first adhesion-promoting structural layer (10) and the mesh base layer (40) are firmly bonded; a second adhesion-promoting structural layer (20), which is an ink-absorbing layer, the second structural layer has an acrylic resin which is the main component (21) and an adhesive (22) coated on the first surface (13) of the first adhesion-promoting structure layer (10), resulting in a bottom surface (23) formed on the first surface (13) of the first adhesion-promoting structure layer (10) and an upper surface (24) formed on the opposite side, so that the second adhesion-promoting structural layer (20) and the first adhesion-promoting structure layer (10) are firmly bonded; and a third adhesion-promoting structural layer (30), which is an advertising ink layer, the third structural layer (30) has an advertising ink which is the main component (31) and an adhesive (32) coated on the upper surface (24) of the second adhesion-promoting structure layer (20), therefore, the mesh base layer (40) of the advertising cloth (50) having the features of refractory, waterproof and ink absorbing.

Also, when the two pieces of advertising cloth are spliced, each of the adhesion-promoting structural layers is thermally melted, the interface molecules generate mutual attraction, so that the two pieces of advertising cloth are firmly bonded.

By the features disclosed above, the splicable environmentally-friendly non-PVC advertising cloth made of a woven structure that having a composite structure with fire-proof, waterproof and ink-absorbing structure arranged on a mesh base layer can be spliced unlimitedly as required by using high frequency splicing, making the environmentally friendly advertising cloth more applicable also improving the overall advertising effect and quality.

DETAILED DESCRIPTION OF THE PREFERRED EMBODIMENT

For better understanding of present invention, I provide the embodiment and drawing enclosed for detailed description. Those who skilled in the art can understand purpose, the feature and benefit of the present invention from the contents disclosed in this specification. Kindly noted that the present invention can be implemented or applied through other different specific embodiments and based on different viewpoints various details in this specification can be various changed without departing from the spirit of the present invention. In addition, the drawings attached to the present invention are merely a schematic illustration and they are not depicted in actual dimensions. The following embodiments will further describe the related technical content of the present invention in detail, but the disclosed content is not intended to limit the technical scope of the present invention.

Figure 5:
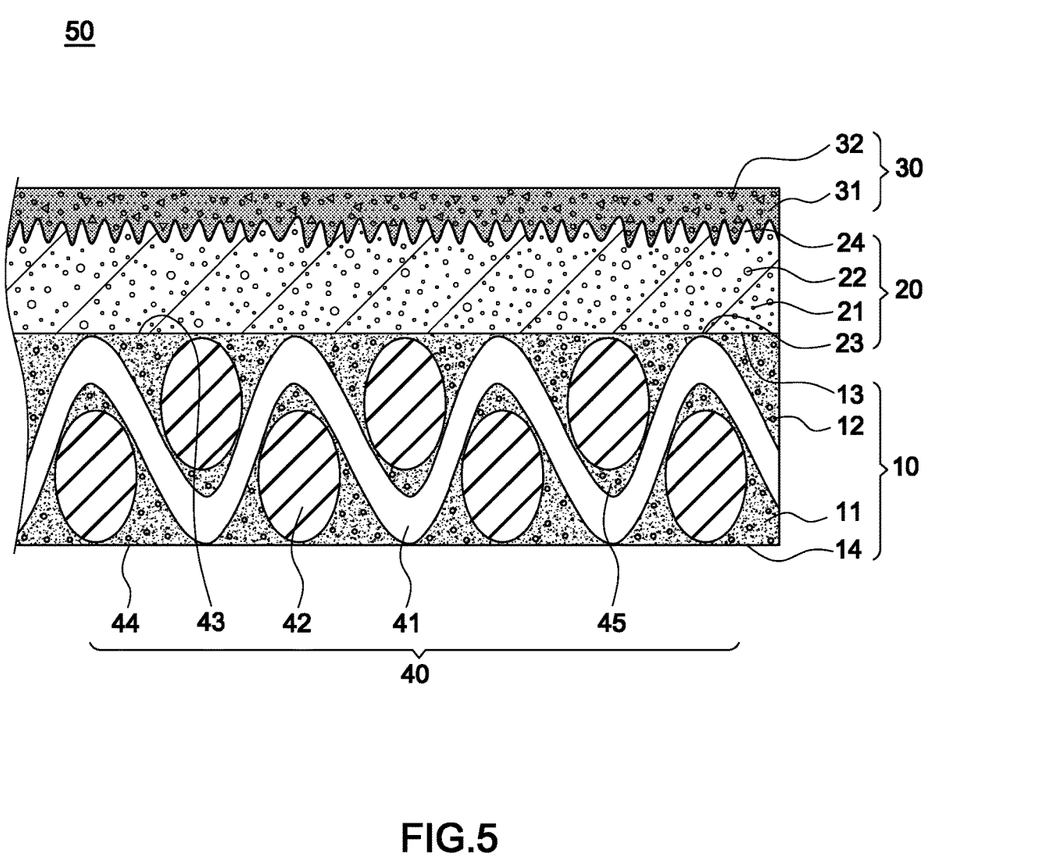
FIG. 5 is a sectional view of the applicable embodiment.

Referring to FIGS. 2-8, the splicable environmentally-friendly non-PVC advertising cloth made of a woven structure on the applicable embodiment, wherein the advertising cloth comprising multiple layers structure below: a mesh base layer (40), which is a knitted fabric made of warp threads (41) and weft threads (42), as FIG. 5 showing, the warp threads (41) and the weft threads (42) are made of polyester fiber, and wherein the mesh base layer (40) has high density meshes (45) and tensile strength, and wherein the mesh base layer (40) further has a front surface (43) and a rear surface (44).

A first adhesion-promoting structural layer (10), which is a fireproof and waterproof layer having a fireproof and waterproof material (11) and an adhesive (12) coated on the mesh base layer (40) for the slurry penetrating the meshes (45) and covering the front surface (43) and the rear surface (44) of the mesh base layer (40) to form a first surface (13) formed on the front surface (43) and a second surface (14) formed on the rear surface (44), so that the first adhesion-promoting structural layer (10) and the mesh base layer (40) are firmly bonded. In this embodiment, the fireproof material can be a fluoride-free phosphate ester fire retardant and the waterproof material can be a fluoride-free waterproof agent, but is not limited; the adhesive (12) can be an epoxy resin adhesive, a polyurethane adhesive, a polyvinyl acetate adhesive, etc., but is not limited. The composition of these materials belongs to the prior art and is not the subject of the present invention. Therefore, their details are not discussed here.

A second adhesion-promoting structural layer (20), which is an ink-absorbing layer, the second structural layer has an acrylic resin which is the main component (21) and an adhesive (22) coated on the first surface (13) of the first adhesion-promoting structure layer (10), resulting in a bottom surface (23) formed on the first surface (13) of the first adhesion-promoting structure layer (10) and an upper surface (24) formed on the opposite side, so that the second adhesion-promoting structural layer (20) and the first adhesion-promoting structure layer (10) are firmly bonded. The composition of these adhesives belongs to the prior art and is not the subject of the present invention.

A third adhesion-promoting structural layer (30), which is an advertising ink layer, the third structural layer has an advertising ink which is the main component (31) and an adhesive (32) coated on the upper surface (24) of the second adhesion-promoting structure layer (20). In this embodiment, the adhesive (32) can be a silicon dioxide. Silicon dioxide is a colorless crystal or white powder, with the exception of hydrofluoric acid, the silicon dioxide is insoluble in water and acids, can be spliced with most metal oxides, is non-flammable, has a high dielectric constant and is highly resistant to heat and impacts. Therefore, the addition of silicon dioxide to the advertising paint can also increase the fire resistance and shrinkage of the advertising paint layer further improving the adhesion-promoting structure.

The advertising cloth (50) has the below features: a mesh base layer (40) with a refractory, waterproof and ink absorbing layer, in addition to the mesh base layer 40, additional adhesives are added to the first and second structural layers and silica is added to the third layer. In this way, the main structure of the advertising cloth (50) of the present invention is the mesh base layer (40) comprising the refractory and waterproof layer with the first adhesion-promoting structure layer (10), the ink-absorbing layer with the second adhesion-promoting structure layer (20); and the advertising ink layer with the third adhesion-promoting structure layer (30). Accordingly, the advertising cloth (50) forms a composite structure with the refractory, waterproof and ink-absorbing layer on the mesh base layer (40) and also has a splicable adhesion-promoting structural layer.

According to the principle of glued adsorption: the main source of bonding force is the molecular force of the bonding system, namely Van der Waals force and hydrogen bonding force. The adhesion and adsorption force between the glue and the surface of the adherend have the same properties. There are two processes of action of the adhesive molecules and the surface molecules of the adherend: the first stage is that the liquid adhesive molecules diffuse to the surface of the adherend by means of Brownian motion, so that the polar groups or chain links on the two interfaces are close to each other; in this process, heating up, applying contact pressure and reducing adhesive viscosity are all conducive to the strengthening of Brownian motion. The second stage is the generation of adsorption force. When the distance between the adhesive and the adherend molecules reaches a predetermined value, the interface molecules generate mutual attraction, which further shortens the distance between the molecules to a maximum stable state. Furthermore, the main structure of the advertising cloth (50) of the present invention comprises: the refractory and waterproof layer with the first adhesion-promoting structure layer (10); the ink-absorbing layer with the second adhesion-promoting structure layer (20); and the advertising ink layer with the third adhesion-promoting structure layer (30). In this way, the advertising cloth (50) forms a composite structure with the refractory, waterproof and ink-absorbing layer on the mesh base layer (40).

According to the principle of glued adsorption mentioned above, the advertising cloth (50) also has a splicable adhesion-promoting structural layer. Since the advertising cloth (50) of the present invention improves the adhesion-imparting structural layer, it can be further spliced by using a high-frequency processing method. The conventional wall cloth had no adhesion-promoting structural layer, so that it could not be spliced by using processing methods such as high frequency and could only be processed by "sewing". Also, the general flatness and quality of the wall cloth that was processed by the "sewing" process is not as good as that of the high-frequency splicing process.

Figure 2:
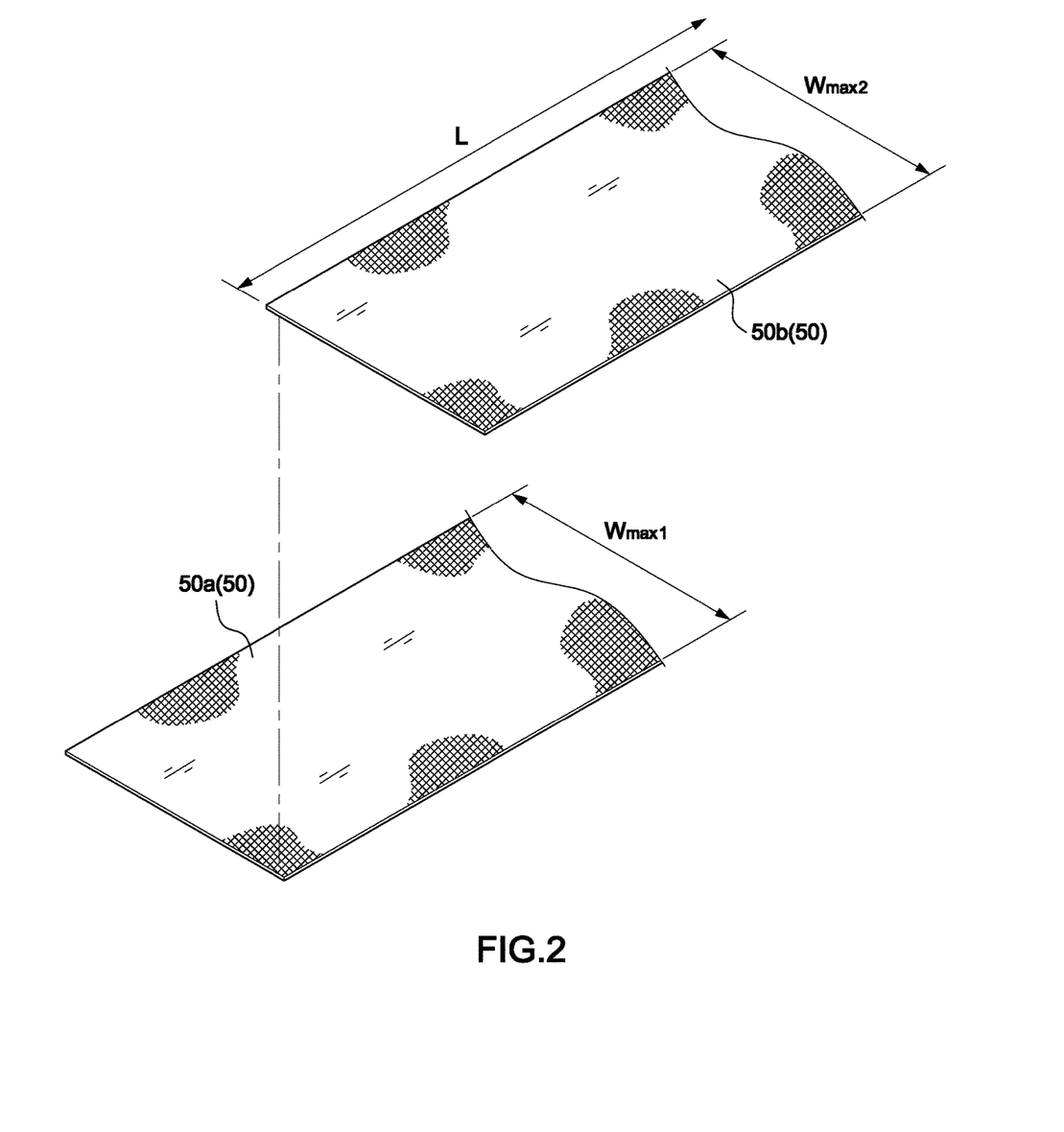
FIG. 2 is an exploded perspective views of the applicable embodiment.
Figure 3:
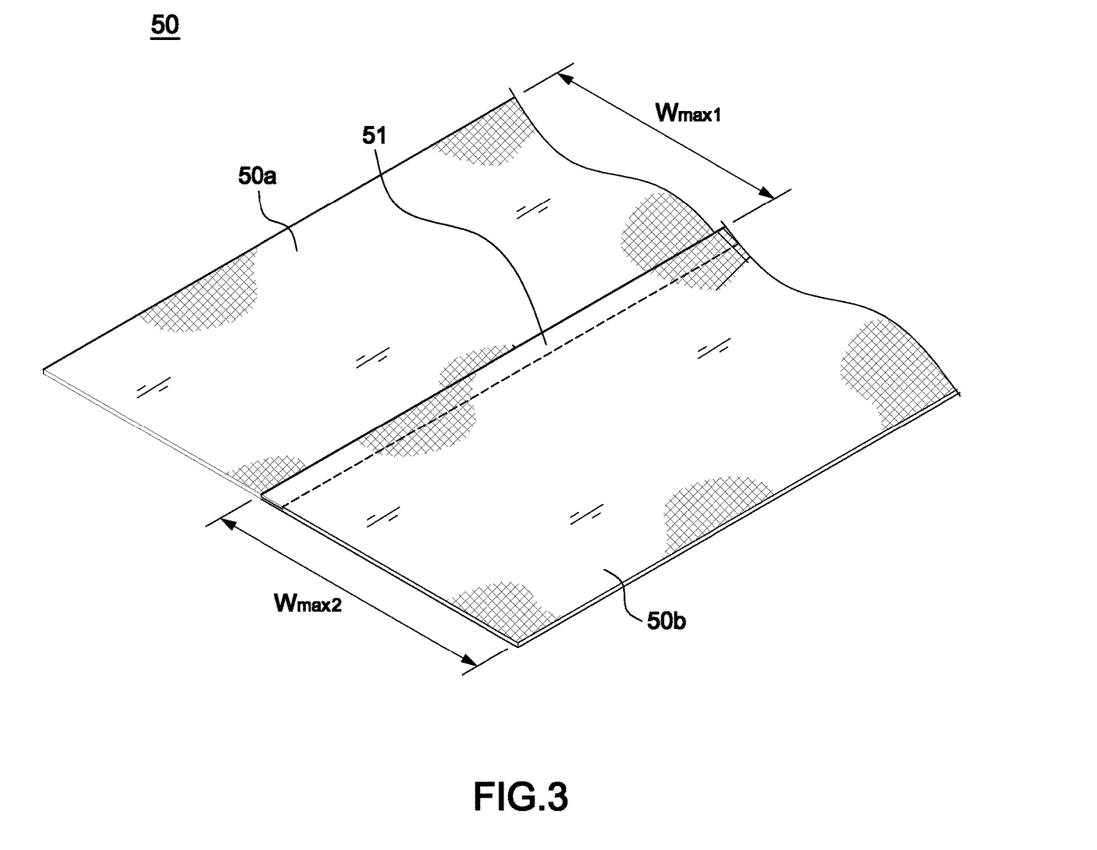
FIG. 3 is an assembly perspective views of the applicable embodiment.
Figure 4:
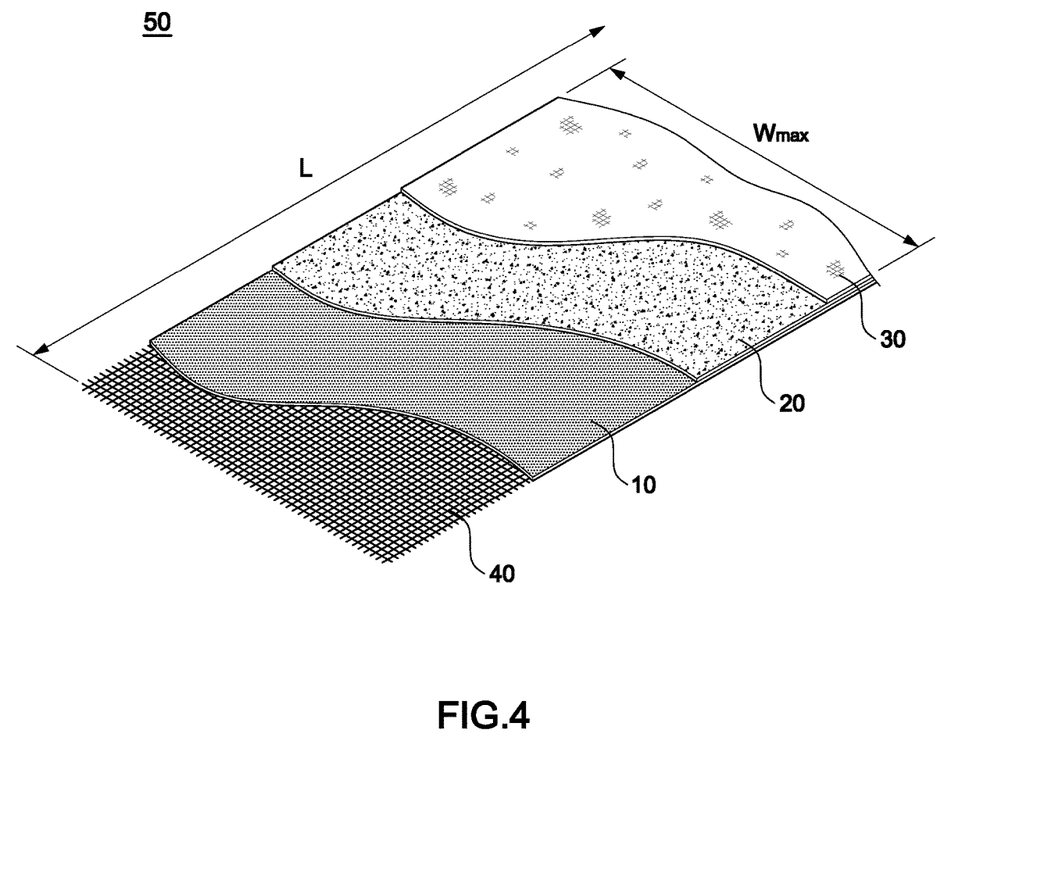
FIG. 4 is a perspective views of the advertising cloth in the applicable embodiment.
Figure 6A:
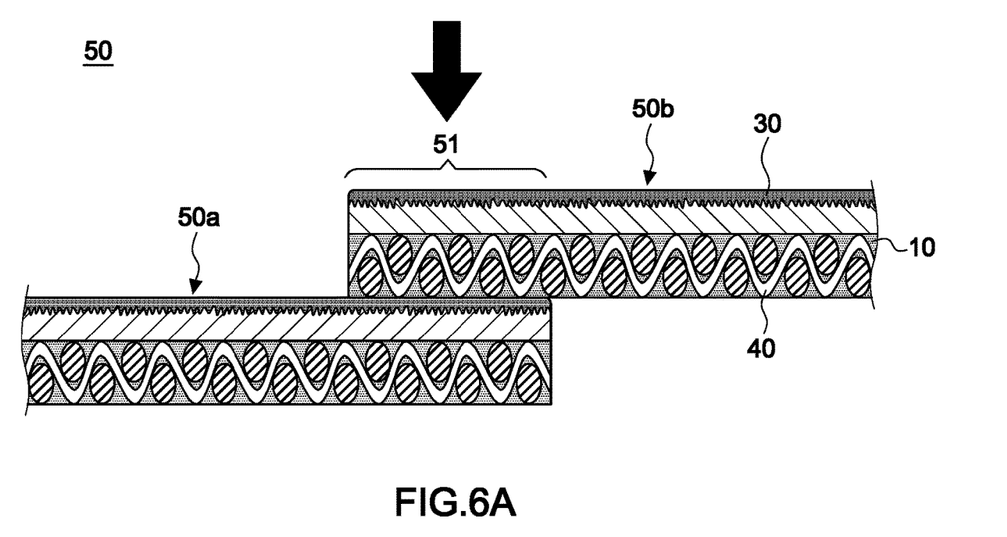
FIG. 6A is a schematic diagram illustrating two advertising cloth before splicing.
Figure 6B:
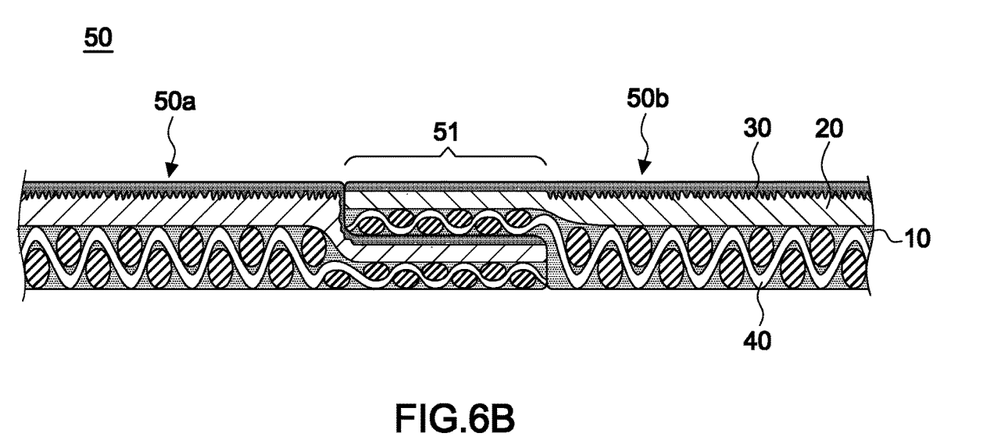
FIG. 6B is a schematic diagram illustrating two advertising cloth after splicing.

As shown in FIGS. 2 and 3, when splicing the two advertising cloth (50a, 50b) the present invention melts the adhesion-promoting structural layers (10, 20, 30) with high frequency for superimposing splicing surfaces (51); and the interface molecules are attracted to one another, so that the two advertising cloth (50a, 50b) are very stably connected to one another after the splicing, as FIGS. 6A and 6B showing.

The PET fiber mesh base layer (40) used in the advertising cloth (50) of the present invention has high-density meshes (45) and high tensile strength. The polyacrylic resin in the refractory and waterproof adhesive layer of the first adhesion-promoting structural layer (10) is a non-toxic, odorless, tasteless and milk-white highly crystalline polymer, with a density of only 0.90 to 0.91 g/cm3, the polyacrylic resin is one of the lightest plastics, which is about 60% corresponds to the density of PVC. Among the general-purpose plastics, polyacrylics have the best heat resistance with a heat resistance of 80 to 100° C., nice resistance to stress cracks and a long flex fatigue life. In addition, the ink-absorbing layer of the second adhesion-promoting structural layer (20) is mainly made of acrylic resin and has an ink-absorbing property with a suitable ratio of the polyacrylic resin.

Therefore, the advertising cloth (50) arranged on the mesh base layer (40) forms a composite structure with a refractory, waterproof and ink-absorbing layer.

The present invention has the following features and effects that need to be clarified:

1. The environmentally friendly advertising cloth (50) of the present invention has been sent to the CSI Italy Laboratory, a facility certified by the European Union, for testing. The test results have reached the fire protection level "Class B" in the European standard for fire protection standards EN13501-1-B-s1-d0, and about the combustion performance of the product, wherein the additional level of smoke development is: "s1". The additional level of burning drops/particles is: "d0". Therefore, the environmentally friendly advertising cloth (50) of the present invention fits the European Union standards for higher fire safety, so that there is no doubt about its flame retardancy and fire resistance.

2. The environmentally friendly advertising cloth (50) of the present invention can achieve the waterproof function and has the properties of being cleanable and does not have the disadvantage of shrinking that the conventional PVC advertising cloth has.

3. The structure of the advertising cloth (50) of the present invention contains no PVC and is non-toxic, so that it is particularly suitable for indoor advertising and interior decoration and fulfills the use for medical purposes.

Figure 7:
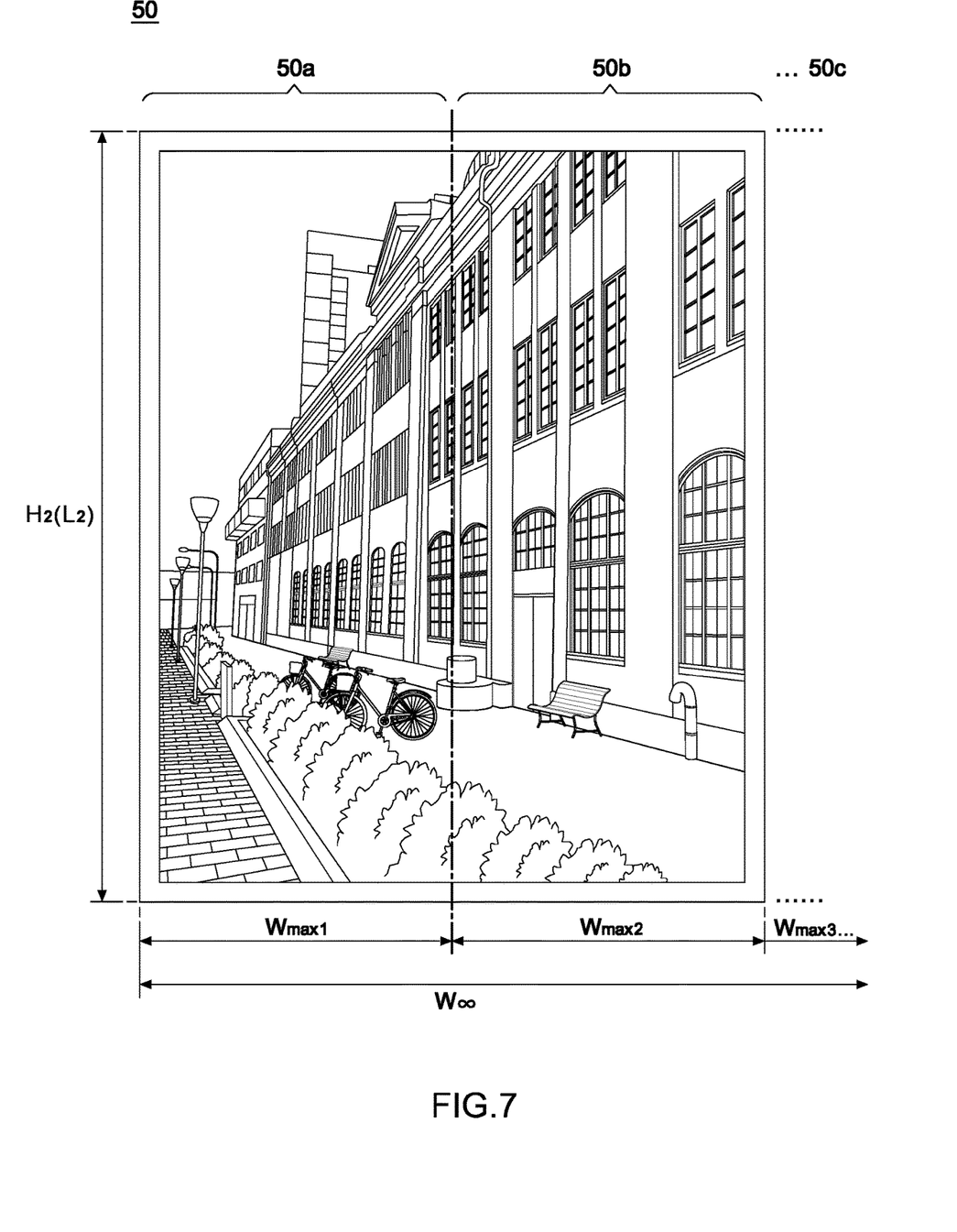
FIG. 7 is a schematic diagram illustrating two painted advertising cloth being spliced.

4. Compared to the conventional PVC advertising cloth in the current market, the structure of the advertising cloth (50) has a weight reduction of almost 35%, so that it is light and soft, and it is easy to be attached and removed. FIG. 7 shows an illustration the splicing of the advertising cloth of the present invention when advertising pattern is printed on each of the advertising cloth (50a), (50b), (50c), etc. before splicing. The maximum width (Wmax) of each advertising cloth (50a), (50b), (50c . . . ) is limited by the existing technology and machine and can only reach a width of approximately 5 meters. However, the present invention can splice the printed advertising cloth (50a), (50b), (50c) with high-frequency processing methods. In this way, the width (W) of the advertising pattern can be unlimited (Wmax1+ Wmax2+Wmax3+ . . . W∞).

Moreover, as FIG. 7 showing, the advertising cloth (50) of the present invention has nice structure strength and can be processed with a predetermined molding machine to make the width (W) of the advertising cloth (50) to be adjusted according to the customer's requirements. The length (L2) of the advertising cloth (50) after molding is exceedingly long, but it can be rolled up. So, when we are producing advertise (A), no matter how the height (H2) it is, it can be cut by requirements. Furthermore, the maximum width (Wmax1+Wmax2+Wmax3+ . . . W∞) of the advertising cloth (50) by splicing variety of advertising cloth (50a+50b+ 50c+ . . . ) can be unlimited. Therefore, the size of the printed image will not be limited. Therefore, the environmentally friendly advertising cloth (50) of the present invention has greater applicability and selectivity.

In addition, the advertising cloth (50) of the present invention also fulfills the environmental protection requirements. The following table is the test report on the biodegradability of the advertising cloth (50) of the present invention.

Report No. SCTF-A20170503-005N

| No. | Test Item | Test Data | Remark |
|---|---|---|---|
| 1 | Percentage of biodegradability 45 days of degradation ) % | 23.5 | Reference ratio (cellulose): 71.5% |
| Note | Description of the sample: The sample is a white wall cloth with an organic carbon content of 43.88%. Reference material is thin layer chromatography cellulose, white powder with particle size 20 μm, organic carbon content 43, 90%; Others: The composting method is using the vermiculite method,: after the compost-specific bacteria have been activated, they are vaccinated in vermiculite and activated for 96 hours. | | |

Figure 8:
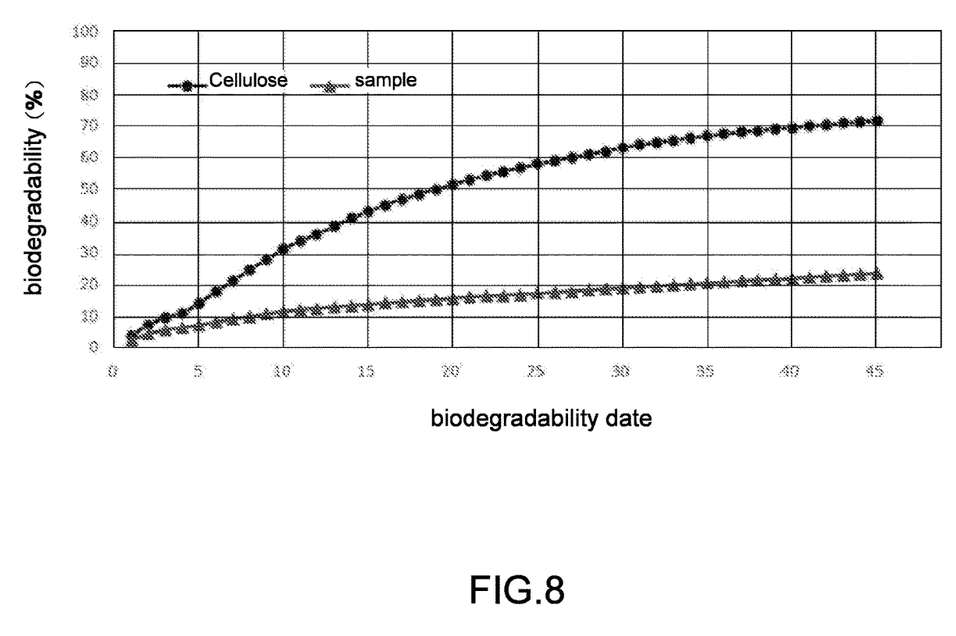
FIG. 8 shows a curve diagram of the biodegradability of the advertising cloth of the invention by means of a composting experiment.

The test spectrum of the advertising cloth (50) of the present invention, the biodegradation curve of the compost test, is shown in FIG. 8.

From the above test report, we can know that the advertising cloth (50) of the present invention is degradable and, in the event of a landfill decomposition, does not produce any other toxic substances which contaminate the soil and water.

Based on the above description, the comparison between the advertising cloth of the present invention and the conventional advertising cloth are shown below:

| | Present invention | Prior art | Conventional PVC |
|---|---|---|---|
| Weight coating material | 110 gsm~370 gsm PA | 110 gsm~370 gsm PA | 220 gsm~900 gsm PVC |
| secondary material | water-based raw materials | water-based raw materials | plasticizer |
| odor | no pungent smell | no pungent smell | pungent chemical smell |
| harmless for human body | REACH168, 33P, Oeko-tex standard 100 | REACH168, 33P, Oeko-tex standard 100 | REACH168, 6P |
| refractory standards | meet Up to M1 | meet Up to M1 | meet Up to M1 |
| Refractory test | EN13501-1 | EN13501-1 | — |
| Applicable dye type | UV, Latex, Dye sub | UV, Latex, Dye sub | Sol, eco-sol, Latex, UV, Screen |
| useful life | longer than one year because there is no plasticizer | longer than one year because there is no plasticizer | ideally 6 months, usually 6-12 months |
| Recycling process | Landfill or incineration does not cause any major pollution and can be recycled | Landfill or incineration does not cause any major pollution and can be recycled | Landfill or incineration will cause huge pollution and hard to be recycled |
| Heat tolerance | −40□~90□ | −40□~90□ | −30□~70□ |
| Increasing the width | Having adhesion-promoting structural layer, using high frequency splicing to increase the width | Cannot increase the width by splicing, only can use sewing to increase width | using high frequency splicing to increase the PVC width |

From the table above, we can tell that although the conventional PVC advertising cloth can be spliced by using high frequency to increase the width of the PVC advertising cloth. However, the advertising cloth (50) of the present invention has the features of refractory, waterproof and ink absorption, easily cleaned, easily removed, not allergy-causing and not toxic. Compared to the prior art wall cloth which cannot be spliced by using high frequency, the advertising cloth of the present invention can be printed with any image and can be spliced to reach the required width. In addition, the width of the advertising cloth of present invention (50a+50b+50c . . . ) can be spliced by using high frequency process, whereby can increase the width unlimitedly. Therefore, the advertising cloth (50) of the present invention can avoid the defect in prior art wall cloth which cannot be spliced by high frequency, and further ensures increased applicability and selectivity.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A splicable environmentally-friendly non-PVC advertising cloth made of a woven structure, wherein the advertising cloth comprising multiple layers structure below:
   a mesh base layer (40), which is a knitted fabric made of warp threads (41) and weft threads(42) the warp threads (41) and the weft threads (42) are made of polyester fiber, and wherein the mesh base layer (40) has high density meshes (45) and tensile strength, and wherein the mesh base layer (40) further has a front surface (43) and a rear surface (44);
   a first adhesion-promoting structural layer (10), which is a fireproof and waterproof layer having a fireproof and waterproof material (11) and an adhesive (12) coated on the n esh base layer (40) for the slurry penetrating the meshes (45) and covering the front surface (43) and the rear surface (44) of the mesh base layer (40) to form a first surface (13) formed on the front surface (43) and a second surface (14) formed on the rear surface (44), so that the first adhesion-promoting structural layer (10) and the mesh base layer (40) are firmly bonded;

a second adhesion-promoting structural layer (20), which is an ink-absorbing layer, the second structural layer has an acrylic resin which is the main component (21) and an adhesive (22) coated on the first surface (13) of the first adhesion-promoting structure layer (10), resulting in a bottom surface (23) formed on the first surface (13) of the first adhesion-promoting structure layer (10) and an upper surface (24) formed on the opposite side, so that the second adhesion-promoting structural layer (20) and the first adhesion-promoting structure layer (10) are firmly bonded; and a third adhesion-promoting structural layer (30), which is an advertising ink layer, the third structural layer (30) has an advertising ink which is the main component (31) and an adhesive(32) coated on the upper surface (24) of the second adhesion-promoting structure layer (20), therefore, the mesh base layer (40) of the advertising cloth (50) having the features of a refractory, waterproof and ink absorbing.

2. The splicable environmentally;-friendly non-PVC advertising cloth made of a woven structure as claimed in claim 1, wherein when splicing the advertising cloth (50*a*) to another advertising cloth (50*b*) the first adhesion-promoting structural layer (10), the second adhesion-promoting structural layer (20), and the third adhesion-promoting structural layer (30) are melted with high frequency for superimposing splicing surfaces (51), and the interface molecules are attracted to one another, so that the advertising cloth (50*a*) and the other advertising cloth (50*b*) are very stably connected to one another after the splicing.

\* \* \* \* \*